(12) United States Patent
Couch et al.

(10) Patent No.: US 6,768,987 B1
(45) Date of Patent: Jul. 27, 2004

(54) SYSTEM AND METHOD FOR FILTERING EXPLAIN TABLES

(75) Inventors: Tanya Couch, San Jose, CA (US); Catherine Elizabeth Wuebker Drummond, Morgan Hill, CA (US); Virginia Walbridge Hughes, Jr., Hollister, CA (US); Theresa Hsing Lai, Saratoga, CA (US); Joseph Davis Lea, III, Chapel Hill, NC (US); David Harold Oberstadt, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,418

(22) Filed: Jan. 13, 2000

Related U.S. Application Data

(63) Continuation-in-part of application No. 08/949,636, filed on Oct. 14, 1997, now Pat. No. 6,243,703.

(51) Int. Cl.[7] ............................................. G06F 17/30
(52) U.S. Cl. ........................ 707/3; 707/2; 707/4; 707/10
(58) Field of Search ..................................... 707/1–10

(56) References Cited

U.S. PATENT DOCUMENTS

| | | | | |
|---|---|---|---|---|
| 4,956,774 A | * | 9/1990 | Shibamiya et al. ............ 707/2 |
| 5,091,852 A | | 2/1992 | Tsuchida et al. ............ 395/600 |
| 5,257,185 A | * | 10/1993 | Farley et al. ............... 707/100 |
| 5,455,945 A | * | 10/1995 | VanderDrift .................... 707/2 |
| 5,544,355 A | * | 8/1996 | Chaudhuri et al. ............ 707/2 |
| 5,548,755 A | * | 8/1996 | Leung et al. .................... 707/2 |
| 5,560,007 A | * | 9/1996 | Thai .............................. 707/2 |
| 5,617,567 A | * | 4/1997 | Doktor .......................... 707/2 |
| 5,734,884 A | * | 3/1998 | Eberhard et al. ............... 707/2 |
| 5,761,654 A | * | 6/1998 | Tow ............................... 707/2 |
| 5,787,416 A | * | 7/1998 | Tabb et al. ..................... 707/2 |
| 5,829,983 A | | 11/1998 | Koyama et al. ............. 434/118 |
| 5,832,501 A | | 11/1998 | Kain, III et al. ............. 707/103 |
| 5,924,088 A | * | 7/1999 | Jakobsson et al. .............. 707/2 |
| 5,974,410 A | | 10/1999 | Copeland et al. ............... 707/3 |
| 6,003,022 A | * | 12/1999 | Eberhard et al. ............... 707/2 |
| 6,052,681 A | * | 4/2000 | Harvey .......................... 707/3 |
| 6,061,676 A | * | 5/2000 | Srivastava et al. ............. 707/2 |
| 6,192,358 B1 | * | 2/2001 | Fuh et al. ....................... 707/4 |
| 6,285,996 B1 | * | 9/2001 | Jou et al. ........................ 707/4 |
| 6,446,062 B1 | * | 9/2002 | Levine et al. .................. 707/3 |
| 6,516,310 B2 | * | 2/2003 | Paulley .......................... 707/3 |
| 6,567,804 B1 | * | 5/2003 | Ramasamy et al. ............ 707/3 |

FOREIGN PATENT DOCUMENTS

| | | |
|---|---|---|
| JP | 10334147 | 12/1998 |
| JP | 11050408 | 2/1999 |

OTHER PUBLICATIONS

"IBM DB2 for OS/390 Visual Explain"—IBM—Jul.—1999—(pps: 1–7).*

Implementation of Automatic Plan Switching Within an Object–Oriented Environment; IBM Technical Disclosure Bulletin; vol. 34 No. 1, Jun. 1991; pp. 46–49.

* cited by examiner

*Primary Examiner*—Jean M. Corrielus
*Assistant Examiner*—Anh Ly
(74) *Attorney, Agent, or Firm*—Kunzler & Associates

(57) ABSTRACT

An apparatus for filtering an explain table according to at least one user-defined filter includes a memory device having thereon modules of operational data and executable code for execution by the processor. The modules include a filter generation module configured to receive user-specified filtering criteria directed to data within a selected column of the explain table and generate in response a user-defined filter. The modules also include a table filtering module configured to apply the user-defined filter to the explain table to selectively exclude rows of the explain table not satisfying the filtering criteria of the user-defined filter.

51 Claims, 16 Drawing Sheets

```
SELECT T1.NAME, T1.DEPT
  FROM T1, T2, T3
    WHERE T1.SALARY = T2.SALARY
    AND T2.DEPT = T3.DEPT
    AND T1.SALARY =
      (SELECT INCOME FROM T4
       WHERE LOCATION = STL)
```

```
RDBMS
  54
```

74

| QUERYNO | 214 | 214 | 214 | 214 | etc. |
|---|---|---|---|---|---|
| QBLOCKNO | 1 | 1 | 1 | 2 | |
| APPLNAME | PLAN1 | PLAN1 | PLAN1 | PLAN2 | |
| PROGNAME | DNSEMPL1 | DNSEMPL1 | DNSEMPL1 | DNSEMPL1 | |
| PLANNO | 1 | 2 | 3 | 1 | |
| METHOD | 0 | 1 | 1 | 1 | |
| TNAME | T1 | T2 | T3 | T4 | |
| TABNO | 1 | 2 | 3 | 1 | |
| ACCESSTYPE | I | I | I | R | |
| MATCHCOLS | 1 | 1 | 1 | 1 | |
| ACCESSNAME | IDX1 | IDX2 | IDX3 | IDX4 | |
| INDEXONLY | N | Y | Y | N | |
| SORTN_UNIQ | N | N | N | N | |
| SORTN_JOIN | N | N | N | N | |
| SORTN_ORDERBY | N | N | N | N | |
| SORTN_GROUPBY | N | N | N | N | |
| SORTC_UNIQ | N | N | N | N | |
| SORTC_JOIN | N | N | N | N | |
| SORTC_ORDERBY | N | N | N | N | |
| SORTC_GROUPBY | N | N | N | N | |
| PREFETCH | L | | | | |
| MIXOPSEQ | 0 | 0 | 0 | 0 | |
| etc. | | | | | |

| Queryno | Appiname | Progname | Procms | Procsu | StmtType | |
|---|---|---|---|---|---|---|
| 1,013 | PL0101 | PK0101 | 9303 | 2873 | SELECT | B |
| 1,076 | PL0101 | PK0101 | 7229 | 2233 | INSERT | B |
| 1,174 | PL0101 | PK0101 | 9302 | 2873 | SELECT | B |
| 1,237 | PL0101 | PK0101 | 7229 | 2233 | INSERT | B |
| 1,334 | PL0101 | PK0101 | 6510 | 2011 | SELECT | B |
| 1,553 | PL0101 | PK0101 | 6510 | 2011 | SELECT | B |

ADMF001.DSN_STATEMNT_TABLE - SFAD

Fig. 14

SYSTEM AND METHOD FOR FILTERING EXPLAIN TABLES

RELATED APPLICATIONS

This application is a continuation-in-part of U.S. patent application Ser. No. 08/949,636, filed Oct. 14, 1997, for "Interpreting Data Using a Graphical User Interface," U.S. Pat. No. 6,243,703, which is incorporated herein by reference.

BACKGROUND OF THE INVENTION

1. Identification of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. The Field of the Invention

The present invention relates generally to computer-implemented database systems. More specifically, the present invention relates to a system and method for filtering explain tables according to user-defined filters.

3. The Relevant Technology

Databases are computerized information storage and retrieval systems. A Relational Database Management System (RDBMS) is a database system which uses relational techniques for storing and retrieving data. Relational databases are organized into tables consisting of rows (tuples) and columns of data. A database typically includes many tables, and each table includes multiple rows and columns. The tables are conventionally stored in direct access storage devices (DASD), such as magnetic or optical disk drives, for semi-permanent storage.

Generally, users communicate with an RDBMS using a Structured Query Language (SQL) interface. The SQL interface allows users to create, manipulate, and query a database by formulating relational operations on the tables, either interactively, in batch files, or embedded in host languages such as C and COBOL. SQL has evolved into a standard language for RDBMS software and has been adopted as such by both the American National Standards Institute (ANSI) and the International Standards Organization (ISO).

The SQL standard provides that each RDBMS should respond to a particular query in the same way, regardless of the underlying database. However, the method that the RDBMS actually uses to find the requested information in the database is left to the RDBMS. Typically, there is more than one method that can be used by the RDBMS to access the requested data. The RDBMS, therefore, attempts to select the method that minimizes the computer time and resources (i.e. cost) for executing the query.

The RDBMS determines how to execute the SQL statements. The set of steps created by the RDBMS for executing the SQL statements is commonly referred to as the "access path." In other words, the access path is a sequence of operations used by the RDBMS to obtain the data requested by the SQL query. Depending on the access path, an SQL statement might search an entire table space, or, alternatively, it might use an index. The access path is the key to determining how well an SQL statement performs. The description of the access path is stored in a plan table, which typically stores the access path data for a plurality of SQL statements.

In addition to determining the access path, many databases estimate the cost (in time or service units) for executing each SQL statement. Typically, the estimated costs are stored in a statement table (in the case of DB2® for OS/390®) or another similar table in the database. Like the plan table, the statement table generally stores the estimated statement costs for a plurality of SQL statements.

Moreover, some databases store information relating to user-defined functions in a function table. User-defined functions can be very useful in developing database applications. Accordingly, it is advantageous to have information relating to the user-defined functions in a single, convenient location.

Collectively, the above-described access path data statement cost data, and function data are referred to as "explain" data. The plan table, statement table, and function table are often called "explain tables." As noted above, the explain data is typically generated at bind time. However, the explain data can also be generated dynamically in response to a user-supplied query statement.

Unfortunately, because of the volume of data in the explain tables, users interested in improving SQL query performance often find the process of analyzing the explain tables difficult and time consuming. For example, it is typically difficult for a user to find the rows in the explain tables that are related to specific statements, functions, applications, and the like. To locate and view the desired rows, the user is typically required to formulate complex SQL queries, which requires a detailed knowledge of the underlying database.

Accordingly, what is needed is a system, method, and article of manufacture for filtering explain tables according to user-defined filters. What is also needed is a system, method, and article of manufacture for generating filters based on user-specified filtering criteria directed to one or more columns of the explain tables. Moreover, what is needed is a system, method, and article of manufacture for specifying filtering criteria in a simple and intuitive manner without the need for formulating complex SQL queries. Additionally, what is needed is a system, method, and article of manufacture for selectively storing and retrieving the user-defined filters.

SUMMARY OF THE INVENTION

The present invention solves the foregoing problems by providing a system, method, and article of manufacture for filtering explain tables according to user-defined filters. In one aspect of the invention, an apparatus for filtering an explain table includes a processor for executing instructions and a memory device having thereon modules of operational data and executable code for execution by the processor. In one embodiment, the modules include a filter generation module configured to receive user-specified filtering criteria directed to data within a selected column of the explain table and generate in response a user-defined filter. In one embodiment, the modules also include a table filtering module configured to apply the user-defined filter to the explain table to selectively exclude rows of the explain table not satisfying the filtering criteria of the user-defined filter.

In another aspect of the invention, a method for filtering an explain table comprising rows and columns includes the step of receiving user-specified filtering criteria directed to at least one column of the explain table and generating in response a user-defined filter. In one embodiment, the method also includes the step of applying the user-defined filter to the explain table to selectively exclude rows of the explain table not satisfying the filtering criteria of the user-defined filter.

In yet another aspect of the invention, an article of manufacture comprises a program storage medium readable by a processor and embodying one or more instructions executable by the processor to perform the above-described method for for filtering an explain table comprising rows and columns according to least one user-defined filter.

These and other objects, features, and advantages of the present invention will become more fully apparent from the following description and appended claims, or may be learned by the practice of the invention as set forth in the following specification.

BRIEF DESCRIPTION OF THE DRAWINGS

These and other more detailed and specific objects and features of the present invention are more fully disclosed in the following specification, reference being had to the accompanying drawings, in which

FIG. 4 is an illustration of a query statement and a portion of a plan table according to one embodiment of the invention;

FIG. 14 is an illustration of a filtered statement table according to one embodiment of the invention;

DETAILED DESCRIPTION OF THE PREFERRED EMBODIMENTS

The preferred embodiments of the present invention will be best understood by reference to the drawings, wherein like parts are designated by like numerals throughout. It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in the Figures, is not intended to limit the scope of the invention, as claimed, but is merely representative of presently preferred embodiments of the invention.

The Figures include schematic block diagrams and flow chart diagrams which illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable data, or merely an "executable," is intended to include any type of computer instructions and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
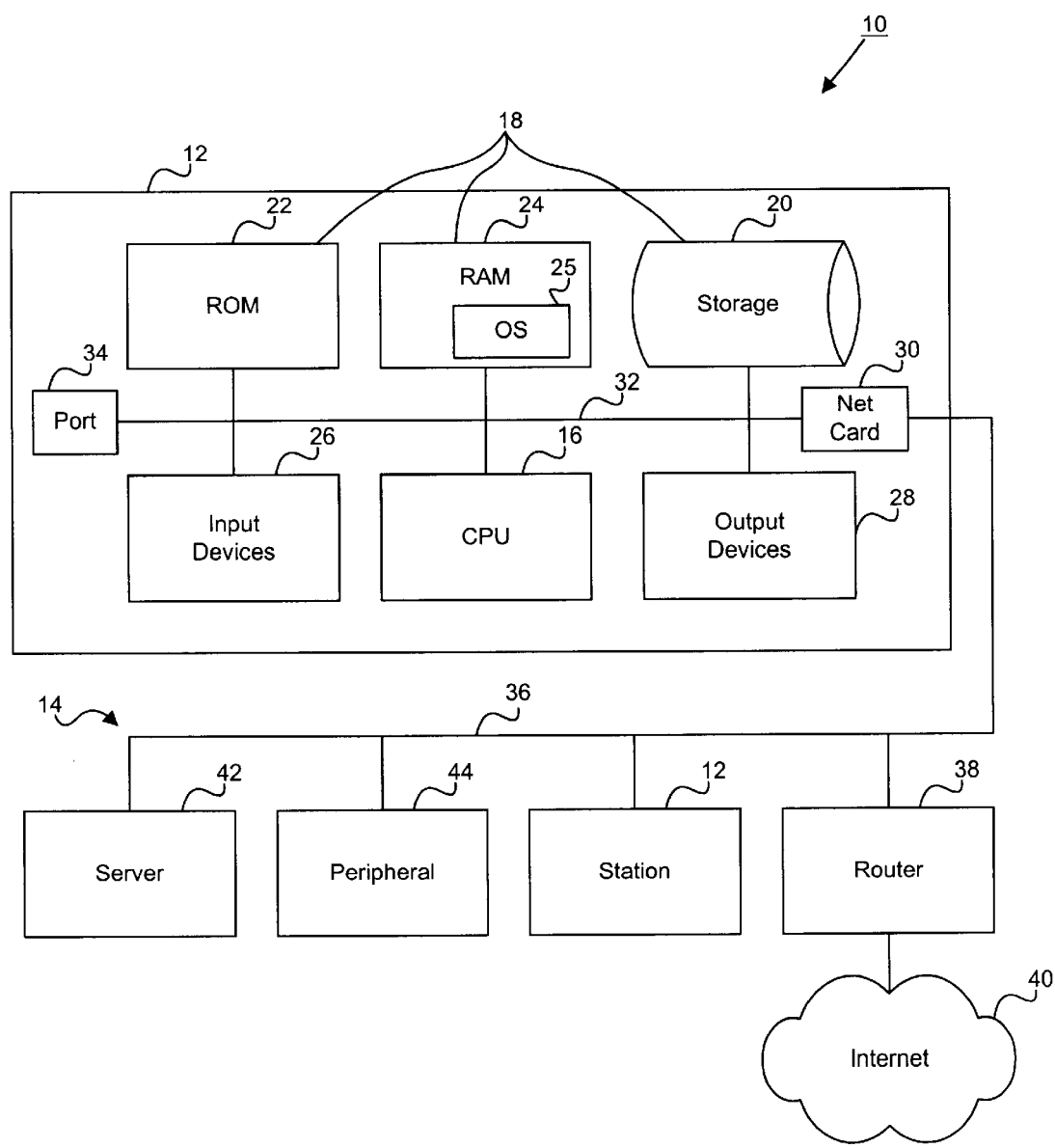
FIG. 1 is a schematic block diagram of a computer system suitable for implementing one embodiment of the invention.

FIG. 1 is a schematic block diagram that illustrates a computer system 10 in which executable and operational data, operating in accordance with the present invention, may be hosted on one or more computer stations 12 in a network 14. The network 14 may comprise a wide area network (WAN) or local area network (LAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD-ROM drive, a read-only memory (ROM) 22, and a random access volatile memory (RAM) 24. Preferably, the computer station 12 operates under the control of an operating system (OS) 25, such as MVS®, OS/390®, AIX®, OS/2®, WINDOWS NT®, WINDOWS®, UNIX®, and the like.

The computer station 12 or system 10 in general may also include one or more input devices 26, such as a mouse or keyboard, for receiving inputs from a user or from another device. Similarly, one or more output devices 28, such as a monitor or printer, may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28, the network card 30, and one or more additional ports 34. The system bus 32 and a network backbone 36 may be regarded as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an intranet, or as in the manner depicted, a system of interconnected networks such as the Internet 40. The individual stations 12 communicate with each other over the backbone 36 and/or over the Internet 40 with varying degrees and types of communication capabilities and logic capability. The individual stations 12 may include a mainframe computer on which the modules of the present invention may be hosted.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
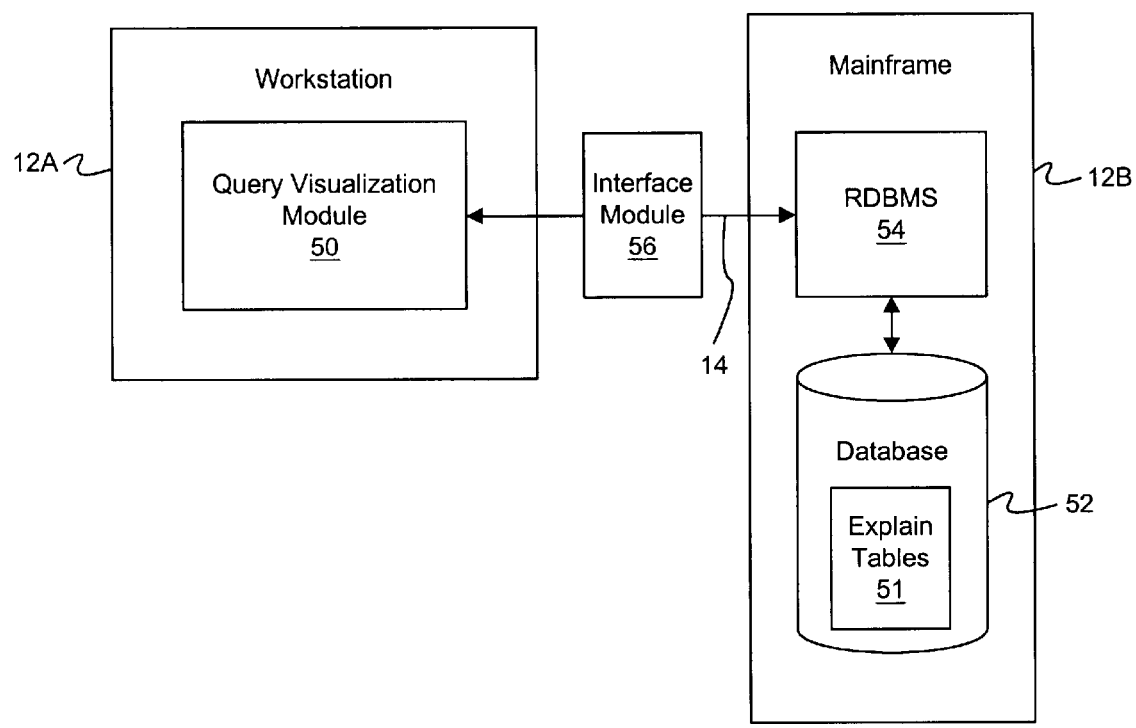
FIG. 2 is a schematic block diagram of a system for filtering explain tables according to one embodiment of the invention.

Referring now to FIG. 2, a schematic block diagram of one embodiment of the invention includes first and second stations 12A, 12B. The first station 12A is preferably a workstation-class computer, such as an PC™ workstation, available from IBM Corporation. The second station 12B is preferably an IBM mainframe computer operating under MVS® or OS/390®. In one embodiment, the stations 12A, 12B are coupled via a network 14 using a distributed remote data architecture (DRDA). Those skilled in the art, however, will recognize that the invention may be implemented using a variety of computing platforms and/or network architectures.

In one embodiment, the first station 12A includes a query visualization module 50, which is a tool that assists a user in visualizing or otherwise understanding explain data for one or more queries to be executed. In one embodiment, the explain data is stored in one or more explain tables 51 in the database 52, which, as described hereafter, may include a plan table, a statement table, and a function table.

The second station 12B preferably stores the database 52, as well as an RDBMS 54 for managing the database 52, such as DB2® for OS/390®, available from IBM. As used herein, the term "database" may generically refer to a combination of the RDBMS 54 and the database 52. In one embodiment, the query visualization module 50 and the RDBMS 54 are linked via an interface module 56, such as DB2 Connect®, also available from IBM.

Figure 3:
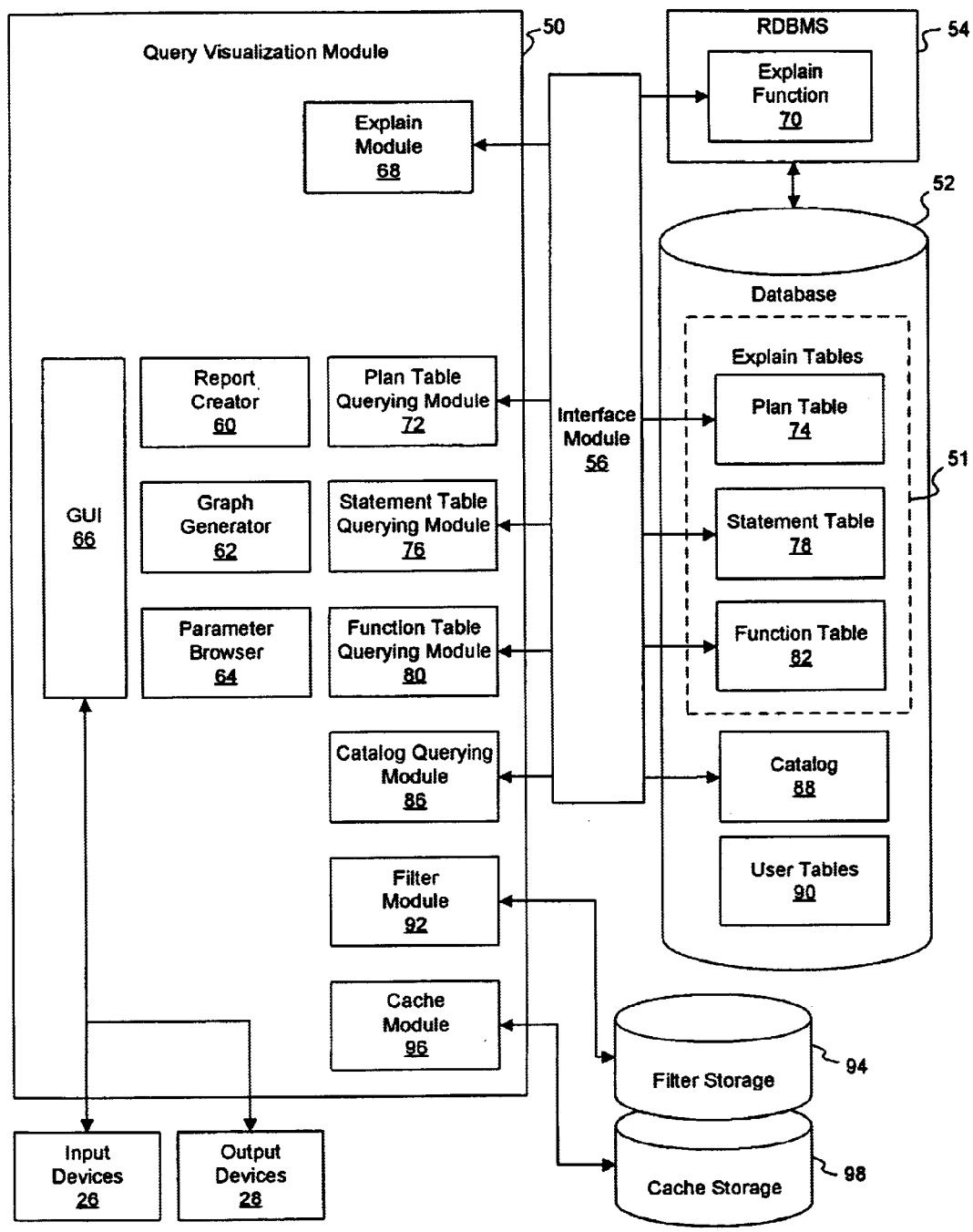
FIG. 3 is a schematic block diagram of a query visualization module according to one embodiment of the invention.

Referring now to FIG. 3, the query visualization module 50 preferably includes a plurality of modules containing executable and operational data suitable for operation within the memory devices 18 of FIG. 1. Of course, the memory devices 18 in which the modules of the present invention are located may also be distributed across both local and remote computer stations 12. Likewise, two or more illustrated modules may be integrated into a single module, or the function of a single module could be performed by a group of modules, without departing from the scope of the invention.

In one embodiment, the principle components of the query visualization module 50 include a report creator 60, a graph generator 62, and a parameter browser 64. The above-described modules are, in one embodiment, intended to help the user to better understand the explain data in a variety of ways.

For example, the report creator 60 selectively prepares a report of the explain data in an easily understood, text-based format. The user may be provided with the option of selecting one or more query statements, as well as subsets of the explain data for the selected query statements to include in the report. The report provides the user with the requested explain data in a centralized and readily understood format, allowing the user to efficiently analyze and improve SQL query performance. The report creator 60 is more fully described in co-pending U.S. application Ser. No. 09/482,595, filed Jan. 13, 2000, using Express Mail Label EL409135377US, for "System and Method for Selectively Preparing Customized Reports of Query Explain Data," now U.S. Pat. No. 6,195,653, which is commonly assigned and is incorporated herein by reference.

A second principal component of the query visualization module 50 is the graph generator 62, which prepares a graphical representation of the access path of a query statement. The graph generator 62 is more fully described in co-pending application Ser. No. 08/949,636, filed Oct. 14, 1997, for "Interpreting Data Using a Graphical User Interface," now U.S. Pat. No. 6,243,703, which is incorporated herein by reference. FIG. 4 illustrates an exemplary SQL query statement, converted by an RDBMS 54 into access path data and stored within a plan table according to one embodiment of the present invention.

Figure 5:
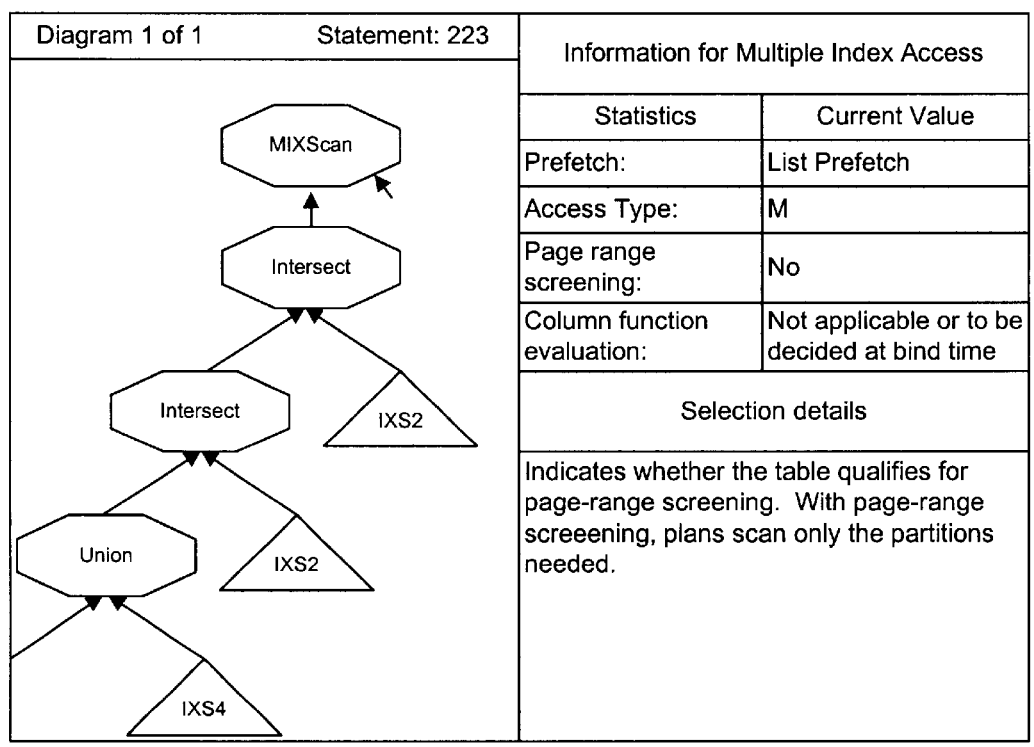
FIG. 5 is an illustration of a graphical representation of an access path according to one embodiment of the invention.

As shown in FIG. 5, the graph generator 62 in one embodiment uses the plan table 74 to generate a graphical representation of the access path. Preferably, access path steps of an SQL statement are graphically represented as nodes within a tree-like structure. Tables, indexes, and operations are graphically represented with unique symbols that indicate the item being represented. For example, rectangles represent tables, triangles represent indexes, and octagons represent operations such as table space scans, index scans, joins, etc. The graphical representation shows the relationship between the database objects and the operations. When the user selects a node of the graphical representation, detailed information related to the selected node is displayed on the right side of the display.

Referring again to FIG. 3, a third principal component of the query visualization module 50 is the parameter browser 64. Preferably, the parameter browser 64 allows a user to selectively view the subsystem parameters, for example, DSNZPARM and DSNHDECP values in the case of DB2® for OS/390®, used by a subsystem, as well as the install panels and fields. Access to subsystem parameters is useful in analyzing the performance of query statements. Like the graph generator 62, the parameter browser 64 is more fully described in co-pending application Ser. No. 08/949,636, filed Oct. 14, 1997, for "Interpreting Data Using a Graphical User Interface," now U.S. Pat. No. 6,243,703.

The report creator 60, graph generator 62, and parameter browser 64 are each preferably coupled to a graphical user interface (GUI) module 66. Preferably, the GUI module 66 is operably coupled to the input and output devices 26, 28 to allow the user to interact with the report creator 60, graph generator 62, and parameter browser 64.

The query visualization module 50 in the depicted embodiment also includes an explain module 68, which invokes a corresponding explain function 70 in the RDBMS 54. When invoked, the explain function 70 causes the RDBMS 54 to generate explain tables 51 for one or more explainable query statements.

In one embodiment, the explain tables 51 includes subsets of query explain data for the explainable query statements. The query explain data preferably indicates how the RDBMS 54 will execute the query statements. For instance, in one embodiment, the explain tables 51 include a plan table 74 for storing access path data, a statement table 78 for storing statement cost data, and a function table 82 for storing data related to user-defined functions. The precise names of the tables are not relevant, and other tables including the same information are within the scope of the present invention.

Preferably, the explainable query statements include the SELECT (except for SELECT INTO) and INSERT statements, and the searched form of the UPDATE and the DELETE statements. The explain module 68 is used to invoke an explain function 70 in which the RDBMS 54 immediately generates explain data for a specific SQL statement. This feature is useful for interactively testing specified SQL statements. Alternatively, the RDBMS 54 generates the explain data at bind time in the context of an application or package upon encountering an EXPLAIN (YES) option of the BIND command.

In one embodiment, the query visualization module 50 includes a plurality of querying modules for querying various tables in the database 52. For example, a plan table querying module 72 queries a plan table 74 to obtain access path data. Likewise, a statement table querying module 76 queries a statement table 78 to obtain statement cost data. A function table querying module 80 queries a function table 82 to obtain data concerning user-defined functions. Finally, a catalog querying module 86 queries the RDBMS catalog 88 to obtain object statistics for one or more database objects contained within in a plurality of user tables 90.

Although the querying function is implemented herein by four separate modules, those skilled in the art will recognize that the described functionality may be implemented by fewer modules. Additionally, in one embodiment, the above-described modules use the interface module 56 when communicating with the RDBMS 54 and database 52.

Preferably, the query visualization module 50 also includes a filter module 92. In one embodiment, the filter module 92 allows a user to filter a list of explainable query statements according to various user-selected criteria, including statement costs, references to particular database objects, and the inclusion of particular steps in the access paths of the statements. Moreover, in one embodiment, the user may assign a name to a set of filtering criteria and save the named set of criteria to, and retrieve the set from, a filter storage 94.

In one embodiment, the filter module 92 also allows a user to filter the explain tables 51 themselves according to user-defined filters. In one embodiment, the filters are directed to data within one or more user-selected columns in the explain tables 51 and are used to selectively exclude rows of the tables 51 that do not satisfy the user-specified filtering criteria. The filter module 92 is described in greater detail below with respect to FIG. 6.

The query visualization module 50 also preferably includes a cache module 96, which caches portions of the above-described tables in a cache storage 98. For example, when the plan table querying module 72 retrieves access path data from the plan table 74, the access path data is preferably stored, and future accesses to the same data will be retrieved from the cache storage 98. Various methods may be employed for managing data in the cache storage 98, such as automatically deleting a percentage of the cached data when the amount of the data exceeds a pre-defined threshold.

Figure 6:
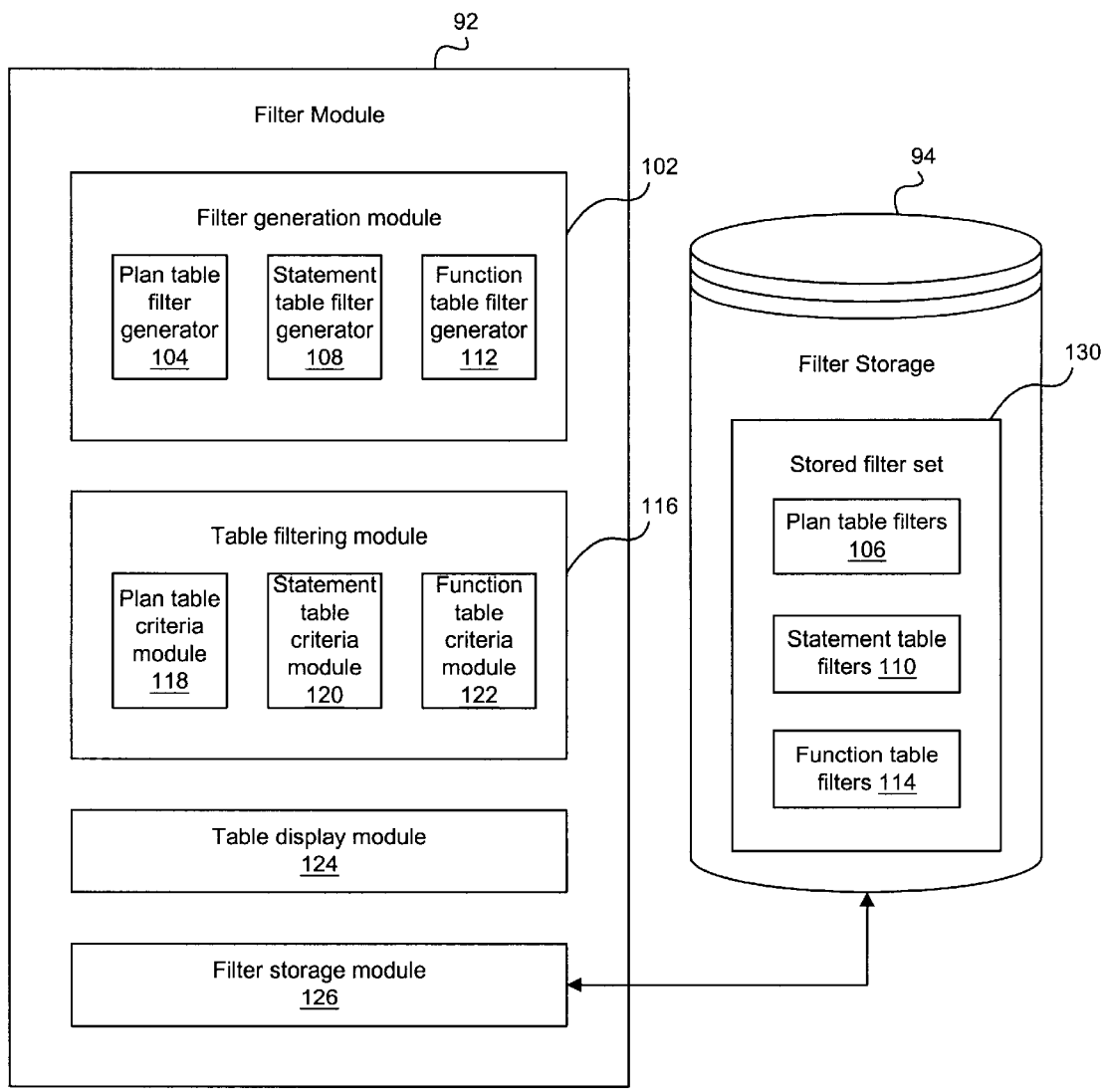
FIG. 6 is a schematic block diagram of a filter module according to one embodiment of the invention.

Referring now to FIG. 6, the filter module 92 preferably includes a plurality of modules containing executable and operational data suitable for operation within the memory devices 18 of FIG. 1. Of course, the memory devices 18 in which the modules of the present invention are located may also be distributed across both local and remote computer stations 12. However, in a preferred embodiment, the modules operate within the workstation 12A. Likewise, two or more illustrated modules may be integrated into a single module without departing from the scope of the invention, and additional modules could be utilized to perform the same functions.

As described above, the explain tables 51 are often very large, particularly in the case of a company-wide database or the like. The user may desire, for example, to view the rows of a plan table 74 relevant to a particular query statement. However, the desired rows are only a small subset of the overall plan table 74. Accordingly, most of the data displayed to the user in an unfiltered view of the plan table 74 is irrelevant, time-consuming to sort through, and may serve to distract or confuse the user.

To alleviate this problem, the filter module 92 preferably includes a filter generation module 102. In one embodiment, the filter generation module 102 allows the user to create one or more filters for selectively excluding rows of an explain table 51. Each filter preferably includes a set of user-specified filtering criteria that is applied to the corresponding rows of the explain table 51 to selectively exclude the rows not satisfying the filtering criteria.

In one embodiment, the filter generation module 102 uses conventional techniques to translate the filtering criteria into SQL code, which is then executed by the RDBMS 54 to filter the explain tables 51. However, a variety of other filtering techniques may be employed within the scope of the invention.

In one embodiment, the filter generation module 102 includes a plan table filter generator 104 for assisting a user in generating one or more plan table filters 106. In one embodiment, each plan table filter 106 includes filtering criteria directed to a column of the plan table 74.

Similarly, the filter generation module 102 includes, in one embodiment, a statement table filter generator 108 for assisting a user in generating one or more statement table filters 110. Each statement table filter 110 preferably includes filtering criteria directed to data of a column of the statement table 78.

Likewise, the filter generation module 102 preferably includes a function table filter generator 112 for assisting a user in generating one or more function table filters 114. Each function table filter 114 preferably includes filtering criteria directed to data of a column of the function table 82.

To apply the foregoing filters, the filter module 92 preferably includes a table filtering module 116. In one embodiment, the table filtering module 116 applies the filtering criteria of the filters to the corresponding explain table 51 to selectively exclude the rows for which the filtering criteria are not satisifed.

In the depicted embodiment, the table filtering module 116 includes a plan table criteria module 118 for applying the filtering criteria of one or more plan table filters 106. Preferably, the plan table criteria module 118 accesses the plan table 74 via the plan table querying module 72 of FIG. 3.

Additionally, the table filtering module 116 preferably includes a statement table criteria module 120 for applying the filtering criteria of one or more statement table filters 110. In one embodiment, the statement table criteria module 116 accesses the statement table 78 via the statement table querying module 76.

In one embodiment, the table filtering module 116 also includes a function table criteria module 122 for applying the filtering criteria of one or more function table filters 114. Preferably, the function table criteria module 122 accesses the function table 82 via the function table querying module 80.

In one embodiment, the filter module 92 also includes a table display module 124. The table display module 124 preferably displays the filtered explain table 51 to the user, and may additionally allow the user to selectively edit one or more explain table 51 entries.

In one embodiment, the filter module 92 also includes a filter storage module 126. After the user has generated one or more filters, the filter storage module 126 preferably allows the user to store the filters as a set 130 in the filter storage 94. In one embodiment, the user may assign a name to a set 130 of stored filters. Later, the user may retrieve and use the stored filters without having to recreate the filters with the filter generation module 102.

Figure 7:
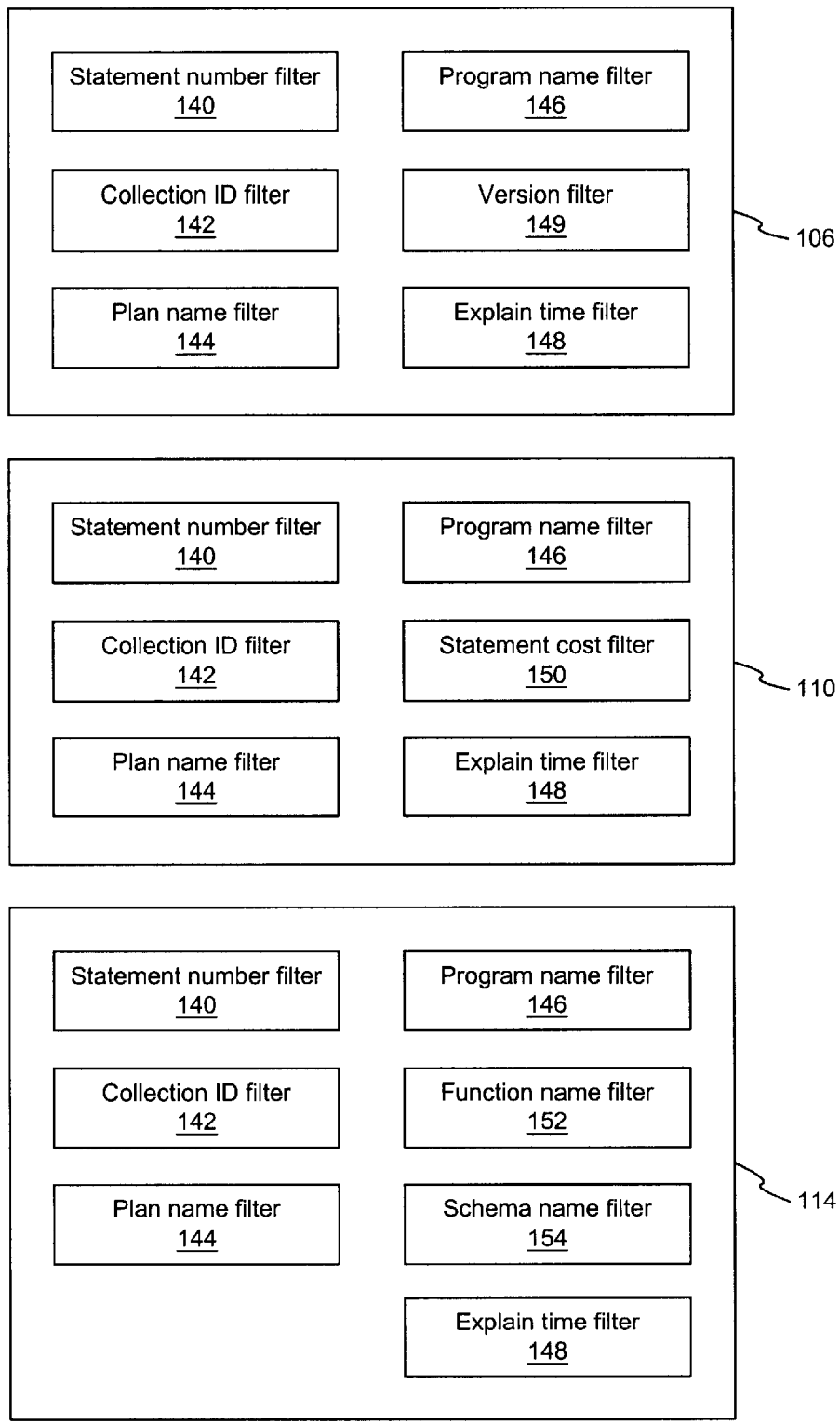
FIG. 7 is a schematic block diagram of a plurality of filters according to one embodiment of the invention.

FIG. 7 illustrates examples of the plan table filters 106, the statement table filters 110, and the function table filters 114 according to one embodiment of the invention. It should be recognized, however, that additional filters could be provided as necessary. In one embodiment, the user may create additional filters as described below.

In one embodiment, the plan table filters 106, statement table filters 110, and function table filters 114 each may include a statement number filter 140. Preferably, the explain tables 51 include a column for storing a statement number for each row. The statement number identifies an associated query statement.

Preferably, the statement number filter 140 includes relational criteria for comparing the statement number of each row with at least one user-specified statement number. In addition, the statement number filter 140 is preferably configured to selectively exclude rows of the explain tables 51 in which the statement number does not satisfy the relational criteria.

The relational criteria for the statement number filter 140, as well as the other filters described below, may include a user-selectable relational operation. In one embodiment, the relational operation may be selected from such operations as greater than, less than, equal to, in, and like.

In one embodiment, the plan table filters 106, statement table filters 110, and function table filters 114 each may include a collection identifier filter 142. Preferably, the explain tables 51 include a column for storing a collection identifier for each row. The collection identifier identifies an associated collection of packages.

Preferably, the collection identifier filter 142 includes relational criteria for comparing the collection identifier of each row with at least one user-specified collection identifier. In addition, the collection identifier filter 142 is preferably configured to selectively exclude rows of the explain tables 51 in which the collection identifier does not satisfy the relational criteria.

In one embodiment, the plan table filters 106, statement table filters 110, and function table filters 114 each may include a plan name filter 144. Preferably, the explain tables 51 include a column for storing a plan name for each row. The plan name preferably identifies an associated plan, which is a collection of query statements corresponding to one or more application programs that pose queries to a database.

Preferably, the plan name filter 144 includes relational criteria for comparing the plan name of each row with at least one user-specified plan name. The plan name filter 144 is preferably configured to selectively exclude rows of the explain tables 51 in which the plan name does not satisfy the relational criteria.

In one embodiment, the plan table filters 106, statement table filters 110, and function table filters 114 each may include a program name filter 146. Preferably, the explain tables 51 include a column for storing a program name for each row. The program name preferably identifies an associated program or package comprising one or more query statements that pose queries to a database.

Preferably, the program name filter 146 includes relational criteria for comparing the program name of each row with at least one user-specified program name. The program name filter 146 is preferably configured to selectively exclude rows of the explain tables 51 in which the program name does not satisfy the relational criteria.

In one embodiment, the plan table filters 106, statement table filters 110, and function table filters 114 each may include an explain time filter 148. Preferably, the explain tables 51 include a column for storing an explain time for each row. The explain time preferably identifies a time at which the bind occurred that invoked the explain function 70.

As described below, the explain time filter 148 includes relational criteria for comparing the explain time of each row with at least one user-specified explain time. The explain time filter 148 is preferably configured to selectively exclude rows of the explain tables 51 in which the explain time does not satisfy the relational criteria.

In one embodiment, the plan table filters 106 may include a version filter 149. Preferably, the plan table 74 includes a column for storing a version identifier for each row. The version identifier preferably identifies a version of an associated package.

Preferably, the version filter 149 includes relational criteria for comparing the version identifier of each row with at least one user-specified version identifier. The version filter 149 is preferably configured to selectively exclude rows of the plan table 74 in which the version identifier does not satisfy the relational criteria.

In one embodiment, the statement table filters 110 may include a statement cost filter 150. Preferably, the statement table 78 includes a column for storing a statement cost for each row. The statement cost preferably identifies a cost (in milliseconds or service units, for example) for executing an associated query statement.

Preferably, the statement cost filter 150 includes relational criteria for comparing the statement cost of each row with at least one user-specified statement cost. The statement cost filter 150 is preferably configured to selectively exclude rows of the statement table 78 in which the statement cost does not satisfy the relational criteria.

In one embodiment, the function table filters 114 may include a function name filter 152. Preferably, the function table 82 includes a column for storing a function name for each row. The function name preferably identifies a name of an associated user-defined function.

Preferably, the function name filter 152 includes relational criteria for comparing the function name of each row with at least one user-specified function name. The function name filter 152 is preferably configured to selectively exclude rows of the function table 82 in which the function name does not satisfy the relational criteria.

In one embodiment, the function table filters 114 may include an schema name filter 154. Preferably, the function table 82 includes a column for storing a schema name for each row. The schema name preferably identifies a name of an associated database schema.

Preferably, the schema name filter 154 includes relational criteria for comparing the schema name of each row with at least one user-specified schema name. The schema name filter 154 is preferably configured to selectively exclude rows of the function table 82 in which the schema name does not satisfy the relational criteria.

Figure 8:
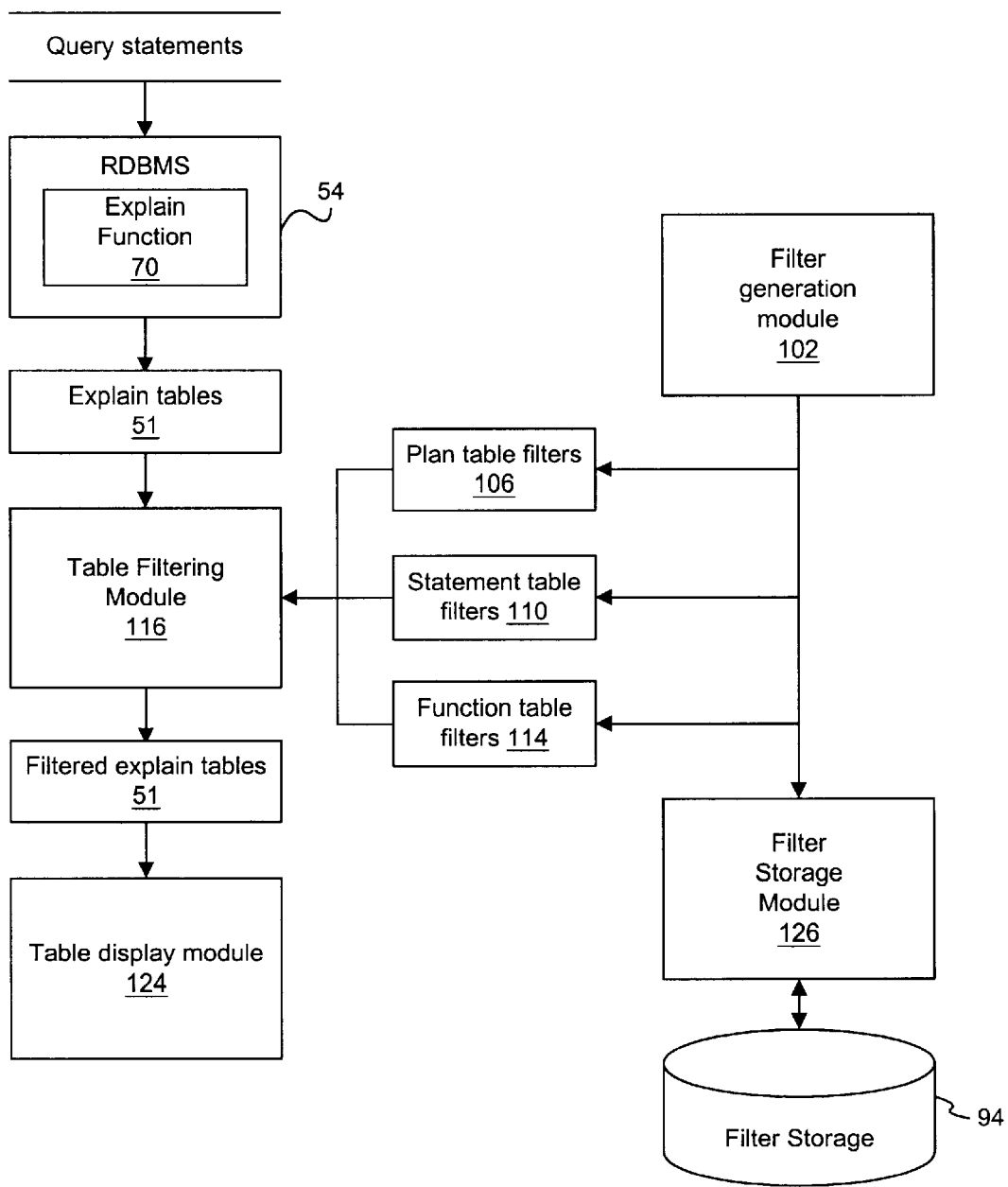
FIG. 8 is an illustration of the data flow within the filter module according to one embodiment of the invention.

FIG. 8 is an illustration of the data flow within the filter module 92 according to one embodiment of the invention. In the illustrated embodiment, a plurality of query statements are processed by the explain function 70 of the RDBMS 54 to populate the explain tables 51 with explain data. In an alternative embodiment, the explain tables 51 are previously populated for all of the query statements at bind time.

A user may, with the filter generation module 102, generate one or more filters, including the above-described plan table filters 106, statement table filters 110, and function table filters 114. Optionally, the filters may be stored in the filter storage 94 by means of the filter storage module 126. Later, a user may retrieve the filters from the filter storage 94 without having to recreate the filters with the filter generation module 102.

In one embodiment, the table filtering module 116 accepts as input one or more explain tables 51 and one or more filters, either generated by the filter generation module 102 or retrieved from the filter storage 94. Using the techniques described above, the table filtering module 116 applies the filtering criteria of each of the user-defined filters to selectively exclude rows of the explain tables 51 that do not satisfy the filtering criteria. Preferably, the table filtering module 116 provides the filtered explain tables 51 to the table display module 124, which displays the filtered explain tables 51 to the user.

Figure 9:
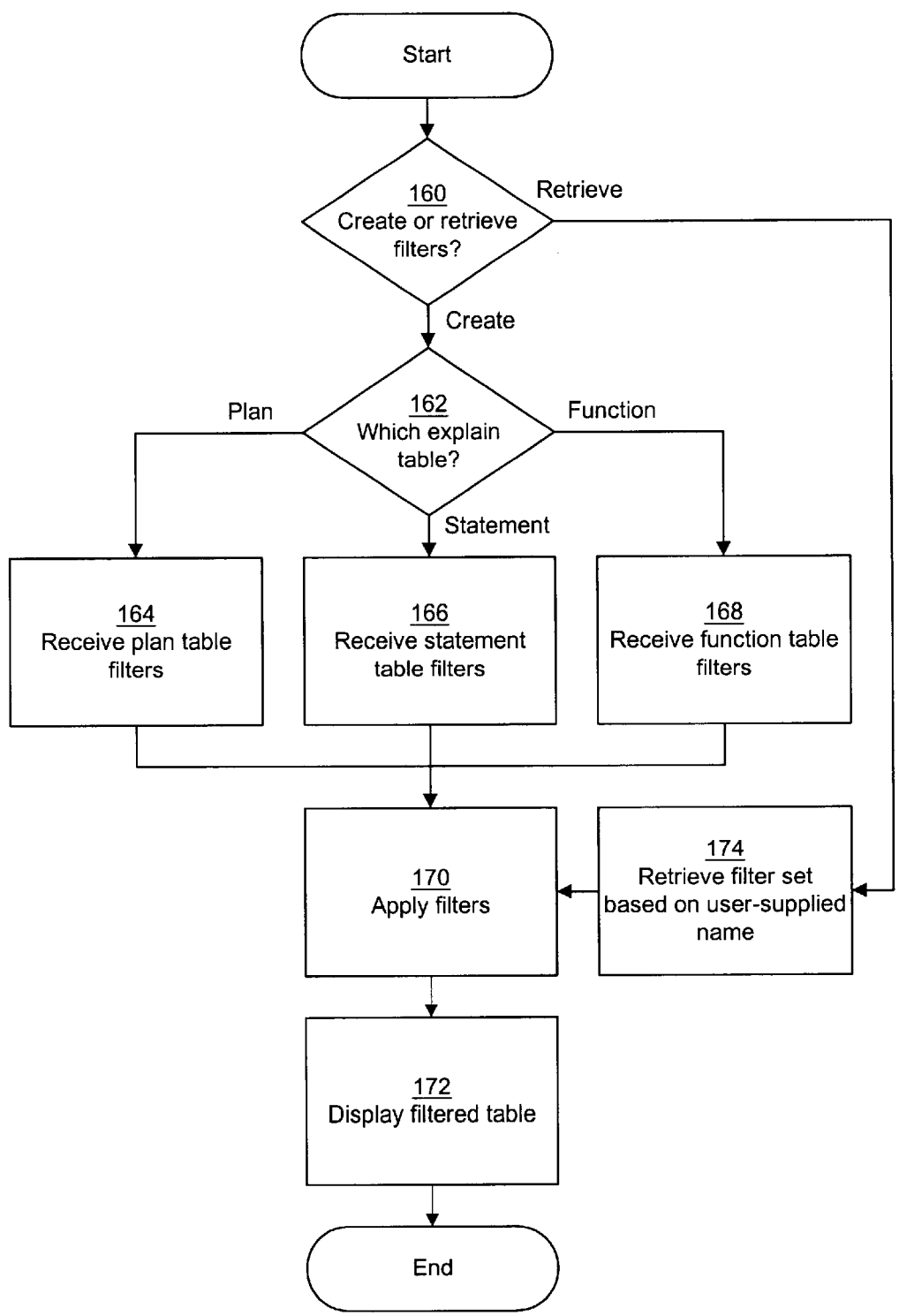
FIG. 9 is a schematic flow chart of a method for filtering explain tables according to user-defined filters of query explain data.
Figure 10:
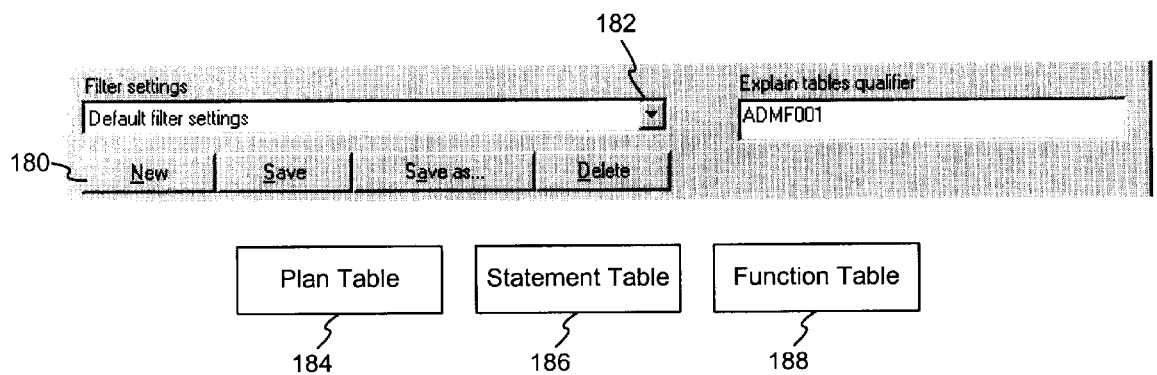
FIG. 10 is an illustration of an interactive display for generating and retrieving filters according to one embodiment of the invention.

Referring now to FIG. 9, a schematic flow chart illustrates a method of filtering explain tables 51 according to one embodiment of the invention. The method begins by determining 160 whether to create new filters or to retrieve a set 130 of stored filters. As illustrated in FIG. 10, a user may elect to create new filters by selecting a "new" button 180 or a similar control. Alternatively, a user may retrieve a set 130 (FIG. 6) of filters from the filter storage 94 by selecting the name of a set 130 from a pull down menu 182 or the like, which lists the names of the filter sets 130 stored in the filter storage 94.

If, in step 160 of FIG. 9, the user elects to create new filters, the method continues by determining 162 which explain table 51 to filter. In one embodiment, a user may select the table 51 to filter by choosing a corresponding button, i.e. a plan table button 184, a statement table button 186, or a function table button 188 in FIG. 10. However, the particular method by which the user selects the explain table 51 is not crucial to the invention. In an alternative embodiment, step 162 may precede step 160, such that a user selects the explain table 51 before indicating whether to create or retrieve the filters.

In one embodiment, the user selects a single explain table 51 and defines one or more filters for the selected table 51. However, in alternative embodiments, the user may select more than one table 51, and define filters for each of a plurality of selected tables 51.

Although the following description discusses the generation of a variety of different filters, it should be recognized that a user may choose to generate no filters, one filter, or a plurality of filters. Preferably, if no filters are generated, the selected explain table 51 is displayed according to a user-specified limit of the number of rows; otherwise, the explain table 51 is filtered according to the filters generated.

Figure 11:
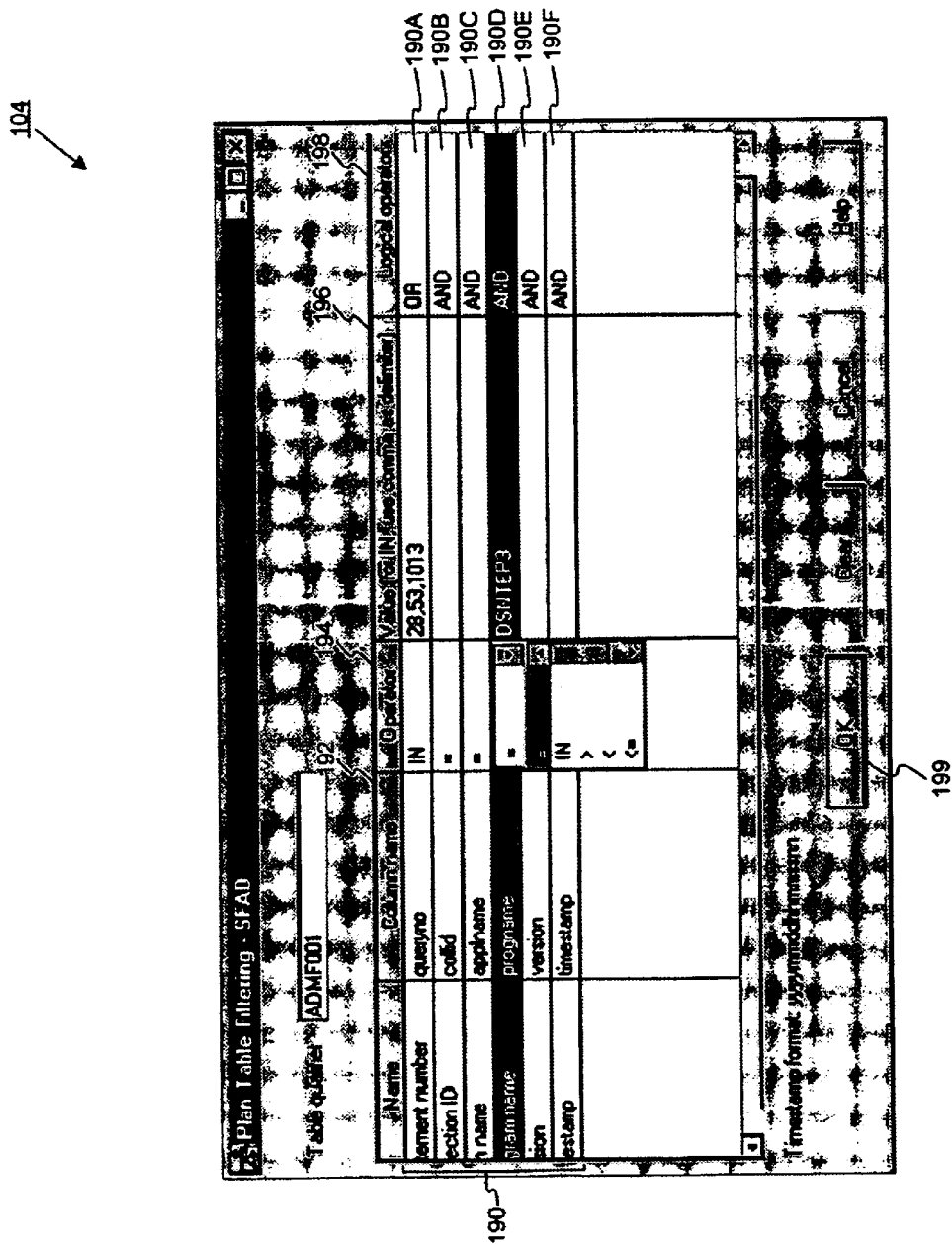
FIG. 11 is an illustration of an interactive display for generating plan table filters according to one embodiment of the invention.

If, in step 162, the user elects to filter a plan table 74, the method continues by receiving 164 the user's definition of one or more plan table filters 106. FIG. 11 is an illustration of an interactive display provided by the plan table filter generator 104.

In one embodiment, the interactive display includes a set of customizable relational expressions 190 for specifying the plan table filters 106. Each of the relational expressions 190 preferably corresponds to one of the above-described plan table filters 106. Thus, in one embodiment, each of the relational expressions 190 relates to a column of the plan table 74 and is applied to the plan table 74 to selectively exclude rows that do not satisfy the relational expression 190.

For example, the relational expressions 190A–F of the depicted embodiment relate to the following respective plan table filters 108: the statement number filter 140, the collection identifier filter 142, the plan name filter 144, the program name filter 146, the version filter 149, and the explain time filter 148. Additional relational expressions 190, however, may be provided within the scope of the invention corresponding to different plan table filters 106.

In the depicted embodiment, each of the relational expressions 190 includes at least four fields: a column field 192, an operator field 194, a value field 196, and a logical operator field 198. The column field 192 preferably specifies a name of a column in the plan table 74. The operator field 194 is preferably user-selectable from a number of relational operators, such as equal to, not equal to, greater than, less than, in, or like. The value field 196 preferably includes one or more user-specified values to be compared with the corresponding plan table 74 values in a column specified in the column field 192. The logical operator field 198 used to logically combine one or more of the relational expressions 190 using a boolean operator such as "AND" and "OR".

In one embodiment, the user may create new relational expressions 190 by adding to the column field 192 a new column name corresponding to a column in the plan table 74. Preferably, the new relational expression 190 will generate a new corresponding plan table filter 106 directed to data of the specified column.

In the depicted embodiment, the relational expression 190A defines the following filtering criterion: "queryno in 28, 53, 1013." Accordingly, to satisfy the relational expression 190A, a row must have in its "queryno" (statement number) column one of three values: 28, 53, or 1013. The "in" operator allows the user to specify a list of values, separated by a comma or other delimiter.

Similarly, the relational expression 190D defines the following filtering criterion: "progname=DSNTEP3." Accordingly, to satisfy the relational expression 190D, a row must have in its "progname" (program name) column the value "DSNTEP3."

The logical operator field 198 of relational expression 190A includes the "OR" operator. Thus, in one embodiment, the relational expressions 190A and 190D are logically OR'ed, and a row in which either relational expression is satisfied will be included by the plan table criteria module 118.

After the plan table filters 106 have been defined, the user may indicate that the filter generation process is compete by selecting an "OK" button 199 or similar control. Thereafter, the method continues with applying 170 the plan table filters 106 to the plan table 74 as described above. The filtered plan table 74 is then displayed 172 by the table display module 124.

Figure 12:
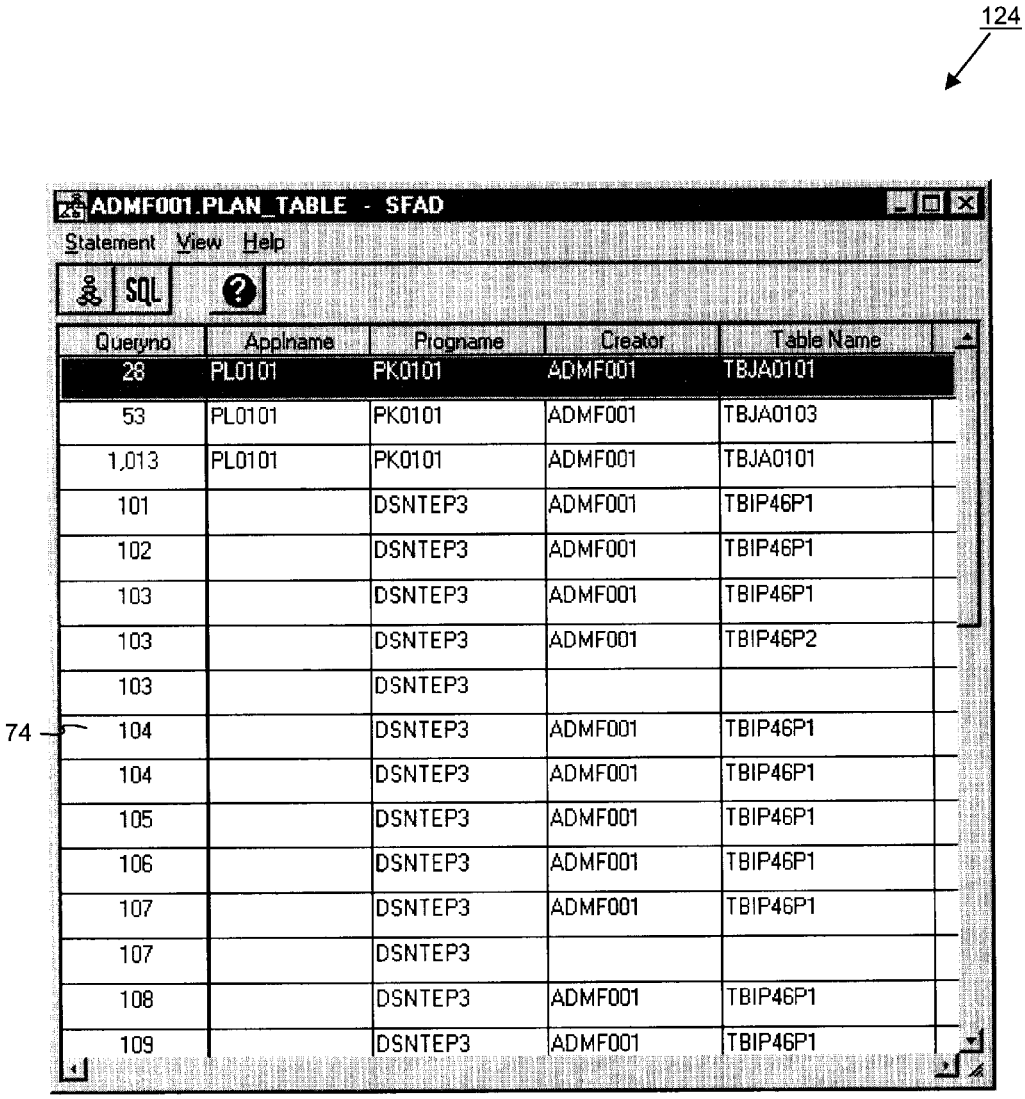
FIG. 12 is an illustration of a filtered plan table according to one embodiment of the invention.

FIG. 12 illustrates the filtered plan table 74. In the depicted embodiment, each row of the filtered plan table 74 has a either a statement number of 28, 53, or 1013, or a program name of "DSNTEP3," as required by the relational expressions 190A and 190D.

Figure 13:
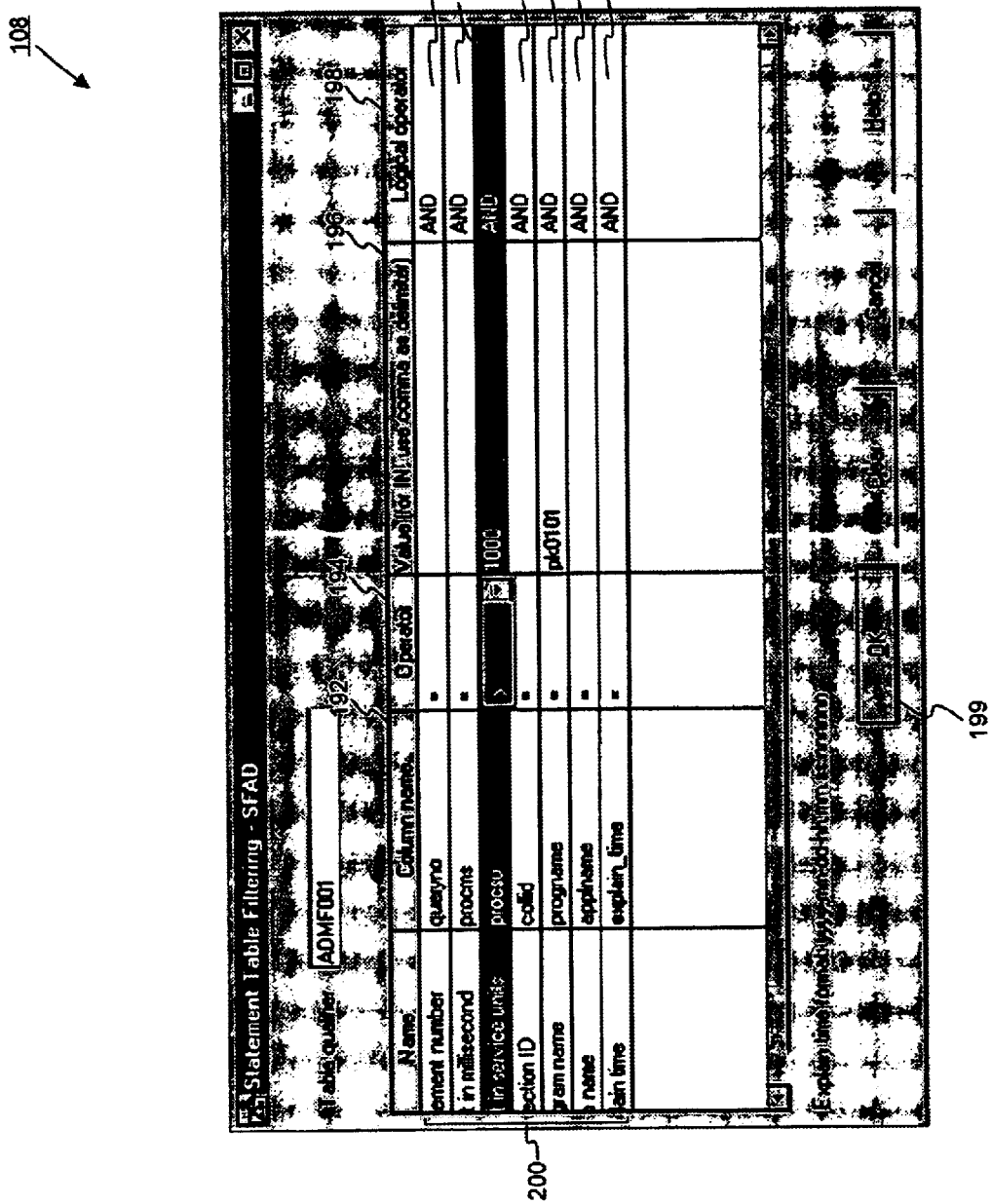
FIG. 13 is an illustration of an interactive display for generating statement table filters according to one embodiment of the invention.

Referring again to step 162 of FIG. 9, if the user elects to filter the statement table 78, the method continues by receiving 166 the user's definition of one or more statement table filters 110. FIG. 13 is an illustration of an interactive display provided by the statement table filter generator 108.

In one embodiment, the interactive display includes a set of customizable relational expressions 200 for specifying the statement table filters 110. Each of the relational expressions 200 preferably corresponds to one of the above-described statement table filters 110. Thus, in one embodiment, each of the relational expressions 200 relates to a column of the statement table 78 and is applied to the statement table 78 to selectively exclude rows that do not satisfy the relational expression 200.

For example, the relational expressions 200A–F of the depicted embodiment relate to the following respective statement table filters 110: the statement number filter 140, the statement cost filter 150, the collection ID filter 142, the program name filter 146, the plan name filter 144, and the explain time filter 148. Additional relational expressions 200, however, may be provided within the scope of the invention corresponding to different statement table filters 110.

In the depicted embodiment, each of the relational expressions 200 includes at least four fields: a column field 192, an operator field 194, a value field 196, and a logical operator field 198. The column field 192 preferably specifies a name of a column in the statement table 78. The operator field 194 is preferably user-selectable from a number of relational operators, such as equal to, not equal to, greater than, less than, in, or like. The value field 196 preferably includes one or more user-specified values to be compared with the corresponding statement table 78 values in a column specified in the column field 192. The logical operator field 198 used to logically combine one or more of the relational expressions 200 using a boolean operator such as "AND" and "OR".

In one embodiment, the user may create new relational expressions 200 by adding to the column field 192 a new column name corresponding to a column in the statement table 78. Preferably, the new relational expression 200 will generate a new corresponding statement table filter 110 directed to the specified column.

In the depicted embodiment, the relational expression 200B defines the following filtering criterion: "procms>1000." Accordingly, to satisfy the relational expression 200B, a row must have in its "procsu" (statement cost in service units) column a value greater than 1000. In the depicted embodiment, additional expressions may be provided corresponding to different cost units. For example, the statement cost may also be expressed in terms of service units, which is a measure of the relative system resources required to execute an associated query statement.

Similarly, the relational expression 200D defines the following filtering criterion: "progname=pk0101". Accordingly, to satisfy the relational expression 200D, a row must have in its "progname" (program name) column the value "pk0101".

The logical operator field 198 of relational expression 200B includes the "AND" operator. Thus, in one embodiment, the relational expressions 200B and 200D are logically AND'ed, and only a row in which both relational expressions are satisfied will be included by the statement table criteria module 120.

After the statement table filters 110 have been defined, the user may indicate that the filter generation process is compete by selecting an "OK" button 199 or similar control. Thereafter, the method continues with applying 170 the statement table filters 110 to the statement table 78 as described above. The filtered statement table 78 is then displayed 172 by the table display module 124.

FIG. 14 illustrates the filtered statement table 78. In the depicted embodiment, each row of the filtered statement table 78 has both a statement cost greater than 1000 service units and a program name of "pk0101", as required by the relational expressions 200B and 200D in FIG. 13.

Figure 15:
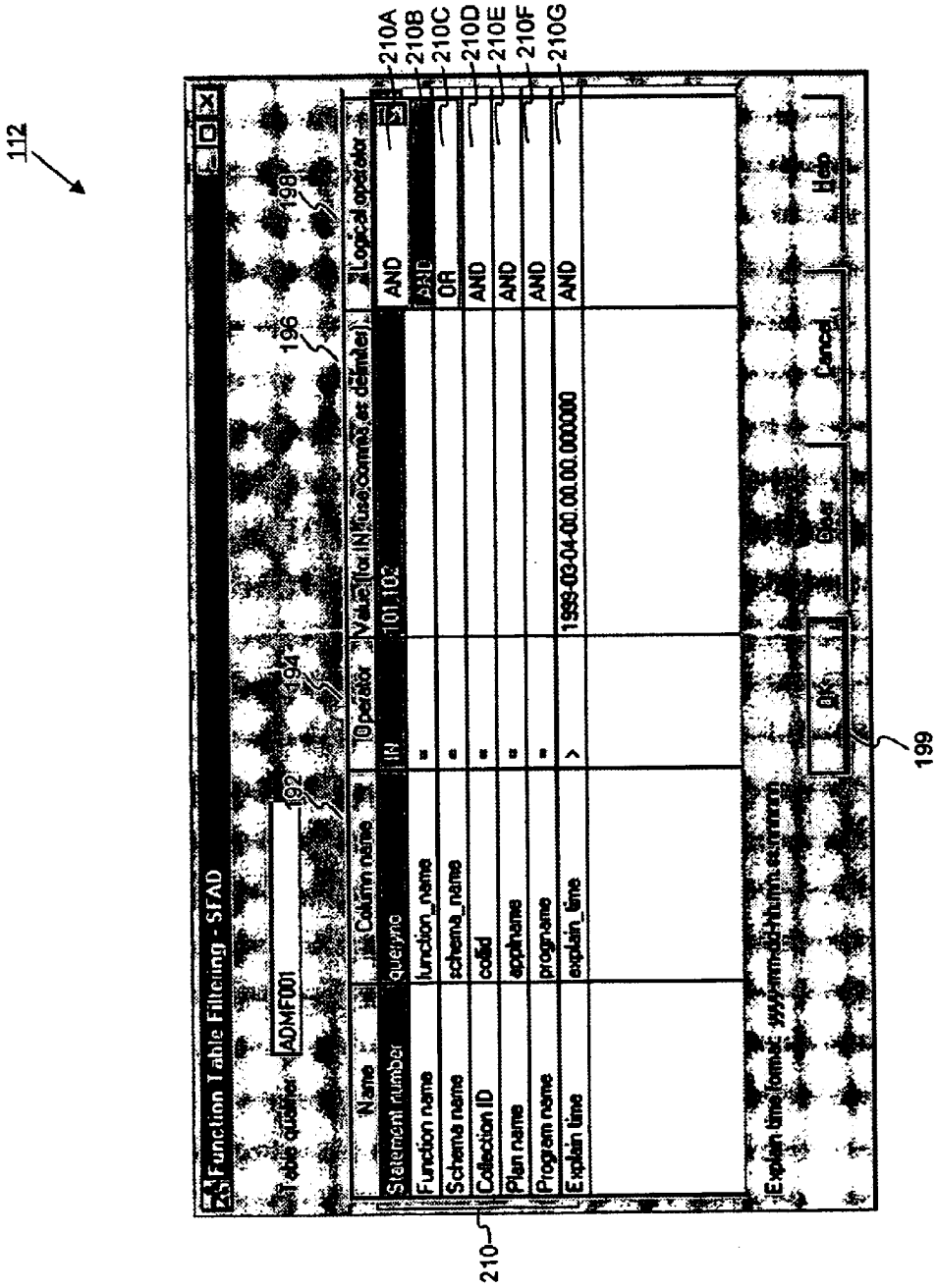
FIG. 15 is an illustration of an interactive display for generating function table filters according to one embodiment of the invention.

Referring again to step 162 of FIG. 9, if the user elects to filter the function table 82, the method continues by receiving the user's definition of one or more function table filters 114. FIG. 15 is an illustration of an interactive display provided by the function table filter generator 112.

In one embodiment, the interactive display includes a set of customizable relational expressions 210 for specifying the function table filters 114. Each of the relational expressions 210 preferably corresponds to one of the above-described function table filters 114. Thus, in one embodiment, each of the relational expressions 210 relates to a column of the function table 82 and is applied to the function table 82 to selectively exclude rows that do not satisfy the relational expression 210.

For example, the relational expressions 210A–G of the depicted embodiment relate to the following respective function table filters 114: the statement number filter 140, the function name filter 152, the schema name filter 154, the collection ID filter 142, the plan name filter 144, the program name filter 146, and the explain time filter 148. A number of additional relational expressions 210 may be provided within the scope of the invention corresponding to different function table filters 114.

In the depicted embodiment, each of the relational expressions 210 includes at least four fields: a column field 192, an operator field 194, a value field 196, and a logical operator field 198. The column field 192 preferably specifies a name of a column in the function table 82. The operator field 194 is preferably user-selectable from a number of relational operators, such as equal to, not equal to, greater than, less than, in, or like. The value field 196 preferably includes one or more user-specified values to be compared with the corresponding function table 82 values in a column specified in the column field 192. The logical operator field 198 is used to logically combine one or more of the relational expressions 210 using a boolean operator such as "AND" and "OR".

In one embodiment, the user may create new relational expressions 210 by adding to the column field 192 a new column name corresponding to a column in the function table 82. Preferably, the new relational expression 210 will generate a new corresponding function table filter 114 directed to the specified column.

In the depicted embodiment, the relational expression 210A defines the following filtering criterion: "queryno IN 101, 102". Accordingly, to satisfy the relational expression 210A, a row must have in its "queryno" (statement number) column either the value 101 or the value 102. The "in" operator allows the user to specify a list of values, separated by a comma or other delimiter.

Similarly, the relational expression 210G defines the following filtering criterion: "explain_time>1999-03-04-00.00.00.000000". Accordingly, to satisfy the relational expression 210G, a row must have in its "explain_time" column a time value subsequent to "1999-03-04-00.00.00.000000".

The logical operator field 198 of relational expression 210A includes the "AND" operator. Thus, in one embodiment, the relational expressions 210A and 210G are logically AND'ed, and only a row in which both relational expressions are satisfied will be included by the function table criteria module 122.

After the function table filters 114 have been defined, the user may indicate that the filter generation process is compete by selecting an "OK" button 199 or similar control. Thereafter, the method continues with applying 170 the function table filters 114 to the function table 82 as described above. The filtered function table 82 is then displayed 172 by the table display module 124.

Figure 16:
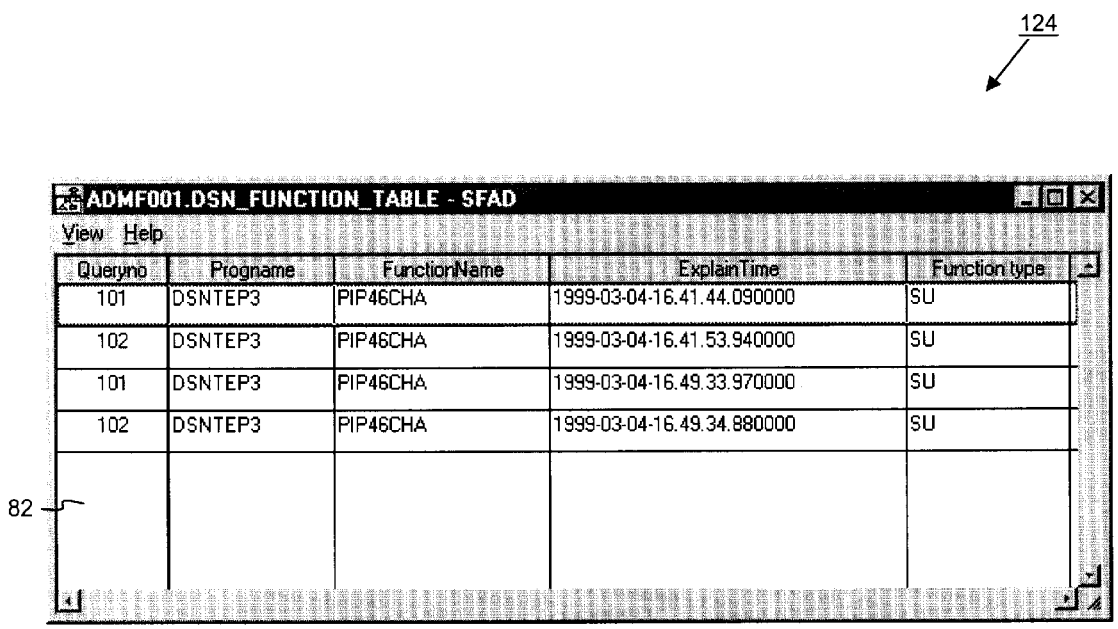
FIG. 16 is an illustration of a filtered function table according to one embodiment of the invention.

FIG. 16 illustrates the filtered function table 82. In the depicted embodiment, each row of the filtered function table 82 has both a statement number of 101 or 102, and an explain time greater than "1999-03-04-00.00.00.000000", as required by the relational expressions 210A and 210G.

As previously noted in step 160 of FIG. 9, a user may elect to retrieve 174 a stored filter set 130, rather than creating new filters by means of the filter generation module 102. This is accomplished, in one embodiment, by selecting a set 130 from a pull down menu 182, as show in FIG. 10, which lists the names of the filter sets 130 stored in the filter storage 94. Thus, if the user elects to retrieve a stored set 130 in step 160, the method continues by receiving 174 a user-specified filter set 130 and retrieving the set 130 from the filter storage 94. Thereafter, the retrieved filter set 130 is applied 170 to the appropriate explain table 51 and the filtered explain table 51 is displayed to the user as previously described.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for filtering an explain table according to at least one user-defined filter, the explain table populated with explain data by a database for indicating to a user how the database will execute one or more query statements and comprising rows and columns, the apparatus comprising:
   a memory device having thereon modules of code for execution by a processor,
      the modules comprising:
         a filter generation module configured to receive user-specified filtering criteria directed to explain data within a selected column of the explain table and to generate a user-defined filter; and
         a table filtering module configured to apply the user-defined filter to the explain table to selectively exclude rows of the explain table not satisfying the filtering criteria of the user-defined filter.

2. The apparatus of claim 1, wherein the explain table is selected from the group consisting of a plan table, a statement table, and a function table.

3. The apparatus of claim 1, wherein the filtering criteria comprise relational criteria, the relational criteria comprising at least one relation selected from the group consisting of "greater than", "less than", "equal to", "in", and "like".

4. The apparatus of claim 1, wherein the explain table includes a column for storing a statement number for each row, the statement number identifying an associated query statement, the at least one user-defined filter comprising:
   a statement number filter including relational criteria for comparing the statement number of each row with at least one user-specified statement number, the statement number filter configured to selectively exclude rows of the explain table in which the statement number does not satisfy the relational criteria.

5. The apparatus of claim 1, wherein explain table includes a column for storing a collection identifier for each row, the collection identifier identifying an associated package of query statements, the at least one user-defined filter comprising:
   a collection identifier filter including relational criteria for comparing the collection identifier of each row with at least one user-specified collection identifier, the statement number filter configured to selectively exclude rows of the explain table in which the collection identifier does not satisfy the relational criteria.

6. The apparatus of claim 1, wherein the explain table includes a column for storing a plan name for each row, the plan name identifying an associated plan comprising one or more query statements, the at least one user-defined filter comprising:
   a plan name filter including relational criteria for comparing the plan name of each row with at least one user-specified plan name, the plan name filter configured to selectively exclude rows of the explain table in which the plan name does not satisfy the relational criteria.

7. The apparatus of claim 1, wherein the explain table includes a column for storing a program name for each row, the program name identifying an associated program or package, the at least one user-defined filter comprising:
   a program name filter including relational criteria for comparing the program name of each row with at least one user-specified program name, the program name filter configured to selectively exclude rows of the explain table in which the program name does not satisfy the relational criteria.

8. The apparatus of claim 1, wherein the explain table includes a column for storing an explain time for each row, the explain time identifying a time at which the explain table was populated, the at least one user-defined filter comprising:

an explain time filter including relational criteria for comparing the explain time of each row with at least one user-specified explain time, the explain time filter configured to selectively exclude rows of the explain table in which the explain time does not satisfy the relational criteria.

9. The apparatus of claim 1, wherein the explain table comprises a statement table including a column for storing a statement cost for each row, the statement cost identifying a cost of executing an associated query statement, the at least one user-defined filter comprising:

a statement cost filter including relational criteria for comparing the statement cost of each row with at least one user-specified statement cost, the statement cost filter configured to selectively exclude rows of the statement table in which the statement cost does not satisfy the relational criteria.

10. The apparatus of claim 1, wherein the explain table comprises a function table including a column for storing a function name for each row, the function name identifying an associated user-defined function, the at least one user-defined filter comprising:

a function name filter including relational criteria for comparing the function name of each row with at least one user-specified function name, the function name filter configured to selectively exclude rows of the function table in which the function name does not satisfy the relational criteria.

11. The apparatus of claim 1, wherein the explain table comprises a function table including a column for storing a schema name for each row, the schema name identifying an associated database schema, the at least one user-defined filter comprising:

a schema name filter including relational criteria for comparing the schema name of each row with at least one user-specified schema name, the schema name filter configured to selectively exclude rows of the function table in which the schema name does not satisfy the relational criteria.

12. The apparatus of claim 1, wherein the explain table comprises a plan table including a column for storing a version identifier for each row, the version identifier identifying a version of an associated package, at least one user-defined filter comprising:

a version identifier filter including relational criteria for comparing the version identifier of each row with at least one user-specified version identifier, the version identifier filter configured to selectively exclude rows of the function table in which the version identifier does not satisfy the relational criteria.

13. The apparatus of claim 1, further comprising:

a filter storage module configured to store a set of filters generated by the filter generation module in a filter storage.

14. The apparatus of claim 13, further comprising:

a display module configured to retrieve a stored set of filters from the filter storage, invoke the table filtering module to apply the retrieved filters to the explain table, and display the filtered explain table to a user.

15. The apparatus of claim 1, wherein the filter generation module is further configured to receive from a user one or more relational expressions for generating the filtering criteria.

16. The apparatus of claim 15, wherein the filter generation module is further configured to receive from a user a BOOLEAN operator for logically combining at least two relational expressions, the BOOLEAN operator selected from the group consisting of "OR" and "AND".

17. The apparatus of claim 1, further comprising:

a filter customization module configured to provide an interactive display including one or more customizable filtering criteria, the filter customization module configured to permit a user to customize the customizable filtering criteria to generate the at least one filter.

18. A method for filtering an explain table according to at least one user-defined filter, the explain table populated with explain data by a database for indicating to a user how the database will execute one or more query statements and comprising rows and columns, the method comprising:

receiving user-specified filtering criteria directed to explain data within a selected column of the explain table and generating a user-defined filter; and applying the user-defined filter to the explain table to selectively exclude rows of the explain table not satisfying the filtering criteria of the user-defined filter.

19. The method of claim 18, wherein the explain table is selected from the group consisting of a plan table, a statement table, and a function table.

20. The method of claim 18, wherein the filtering criteria comprise relational criteria, the relational criteria comprising at least one relation selected from the group consisting of "greater than", "less than", "equal to", "in", and "like".

21. The method of claim 18, wherein the explain table includes a column for storing a statement number for each row, the statement number identifying an associated query statement, the filtering step comprising:

comparing the statement number of each row with at least one user-specified statement number; and selectively excluding rows of the explain table in which the statement number does not satisfy user-specified relational criteria.

22. The method of claim 18, wherein the explain table includes a column for storing a collection identifier for each row, the collection identifier identifying an associated package of query statements, the filtering step comprising:

comparing the collection identifier of each row with at least one user-specified collection identifier; and selectively excluding rows of the explain table in which the collection identifier does not satisfy user-specified relational criteria.

23. The method of claim 18, wherein the explain table includes a column for storing a plan name for each row, the plan name identifying an associated plan comprising one or more query statements, the filtering step comprising:

comparing the plan name of each row with at least one user-specified plan name; and selectively excluding rows of the explain table in which the plan name does not satisfy user-specified relational criteria.

24. The method of claim 18, wherein the explain table includes a column for storing a program name for each row, the program name identifying an associated program or package, the filtering step comprising:

comparing the program name of each row with at least one user-specified program name; and selectively exclude rows of the explain table in which the program name does not satisfy user-specified relational criteria.

25. The method of claim 18, wherein the explain table includes a column for storing an explain time for each row, the explain time identifying a time at which the explain table was populated, the filtering step comprising:

comparing the explain time of each row with at least one user-specified explain time; and selectively excluding rows of the explain table in which the explain time does not satisfy user-specified relational criteria.

26. The method of claim 18, wherein the explain table comprises a statement table including a column for storing a statement cost for each row, the statement cost identifying a cost of executing an associated query statement, the filtering step comprising:

comparing the statement cost of each row with at least one user-specified statement cost; and selectively excluding rows of the statement table in which the statement cost does not satisfy user-specified relational criteria.

27. The method of claim 18, wherein the explain table comprises a function table including a column for storing a function name for each row, the function name identifying an associated user-defined function, the filtering step comprising:

comparing the function name of each row with at least one user-specified function name; and selectively excluding rows of the function table in which the function name does not satisfy user-specified relational criteria.

28. The method of claim 18, wherein the explain table comprises a function table including a column for storing a schema name for each row, the schema name identifying an associated database schema, the filtering step comprising:

comparing the schema name of each row with at least one user-specified schema name; and selectively excluding rows of the function table in which the schema name does not satisfy user-specified relational criteria.

29. The method of claim 18, wherein the explain table comprises a plan table including a column for storing a version identifier for each row, the version identifier identifying a version of an associated package, the filtering step comprising:

comparing the version identifier of each row with at least one user-specified version identifier; and selectively excluding rows of the function table in which the version identifier does not satisfy user-specified relational criteria.

30. The method of claim 18, further comprising:

receiving from a user a name for a set of user-defined filters; and storing the set of user-defined filters in a filter storage.

31. The method of claim 18, further comprising:

receiving from a user a name for a set of user-defined;

retrieving the named set of user-defined filters from a filter storage; and applying the named set of user-defined filters to the explain table.

32. The method of claim 18, further comprising:

receiving from a user one or more relational expressions for generating the filtering criteria.

33. The method of claim 32, further comprising:

receiving from a user a BOOLEAN operator for logically combining at least two of the relational expressions, wherein the BOOLEAN operator is selected from the group consisting of "OR" and "AND".

34. The method of claim 18, further comprising:

providing an interactive display including one or more customizable filtering criteria; and permitting a user to customize the customizable filtering criteria to generate the at least one filter.

35. An article of manufacture comprising a program storage medium readable by a processor and embodying one or more instructions executable by the processor to perform a method for filtering an explain table according to least one user-defined filter, the explain table populated with explain data by a database for indicating to a user how the database will execute one or more query statements and comprising rows and columns, the method comprising:

receiving user-specified filtering criteria directed to explain data within a selected column of the explain table and generating a user-defined filter; and applying the user-defined filter to the explain table to selectively exclude rows of the explain table not satisfying the filtering criteria of the user-defined filter.

36. The article of manufacture of claim 35, wherein the explain table is selected from the group consisting of a plan table, a statement table, and a function table.

37. The article of manufacture of claim 35, wherein the filtering criteria comprise relational criteria, the relational criteria comprising at least one relation selected from the group consisting of "greater than", "less than", "equal to", "in", and "like".

38. The article of manufacture of claim 35, wherein the explain table includes a column for storing a statement number for each row, the statement number identifying an associated query statement, the filtering step comprising:

comparing the statement number of each row with at least one user-specified statement number; and selectively excluding rows of the explain table in which the statement number does not satisfy user-specified relational criteria.

39. The article of manufacture of claim 35, wherein the explain table includes a column for storing a collection identifier for each row, the collection identifier identifying an associated package, the filtering step comprising:

comparing the collection identifier of each row with at least one user-specified collection identifier; and selectively excluding rows of the explain table in which the collection identifier does not satisfy user-specified relational criteria.

40. The article of manufacture of claim 35, wherein the explain table includes a column for storing a plan name for each row, the plan name identifying an associated plan comprising one or more query statements, the filtering step comprising:

comparing the plan name of each row with at least one user-specified plan name; and selectively excluding rows of the explain table in which the plan name does not satisfy user-specified relational criteria.

41. The article of manufacture of claim 35, wherein the explain table includes a column for storing a program name for each row, the program name identifying an associated program or package, the filtering step comprising:

comparing the program name of each row with at least one user-specified program name; and selectively exclude rows of the explain table in which the program name does not satisfy user-specified relational criteria.

42. The article of manufacture of claim 35, wherein the explain table includes a column for storing an explain time for each row, the explain time identifying a time at which the explain table was populated, the filtering step comprising:

comparing the explain time of each row with at least one user-specified explain time; and selectively excluding rows of the explain table in which the explain time does not satisfy user-specified relational criteria.

43. The article of manufacture of claim 35, wherein the explain table comprises a statement table including a column for storing a statement cost for each row, the statement cost identifying a cost of executing an associated query statement, the filtering step comprising:

comparing the statement cost of each row with at least one user-specified statement cost; and selectively excluding rows of the statement table in which the statement cost does not satisfy user-specified relational criteria.

44. The article of manufacture of claim 35, wherein the explain table comprises a function table including a column for storing a function name for each row, the function name identifying an associated user-defined function, the filtering step comprising:

comparing the function name of each row with at least one user-specified function name; and selectively excluding rows of the function table in which the function name does not satisfy user-specified relational criteria.

45. The article of manufacture of claim 35, wherein the explain table comprises a function table including a column for storing a schema name for each row, the schema name identifying an associated database schema, the filtering step comprising:

comparing the schema name of each row with at least one user-specified schema name; and selectively excluding rows of the function table in which the schema name does not satisfy user-specified relational criteria.

46. The article of manufacture of claim 35, wherein the explain table comprises a plan table including a column for storing a version identifier for each row, the version identifier identifying a version of an associated package for querying the database, the filtering step comprising:

comparing the version identifier of each row with at least one user-specified version identifier;

and selectively excluding rows of the function table in which the version identifier does not satisfy user-specified relational criteria.

47. The article of manufacture of claim 35, the method further comprising:

receiving from a user a name for a set of user-defined filters; and storing the set of user-defined filters in a filter storage.

48. The article of manufacture of claim 35, the method further comprising:

receiving from a user a name for a set of user-defined;

retrieving the named set of user-defined filters from a filter storage; and applying the named set of user-defined filters to the explain table.

49. The article of manufacture of claim 35, the method further comprising:

receiving from a user one or more relational expressions for generating the filtering criteria.

50. The article of manufacture of claim 49, the method further comprising:

receiving from a user a BOOLEAN operator for logically combining at least two of the relational expressions, wherein the BOOLEAN operator is selected from the group consisting of "OR" and "AND".

51. The article of manufacture of claim 35, the method further comprising:

providing an interactive display including one or more customizable filtering criteria; and permitting a user to customize the customizable filtering criteria to generate the at least one filter.

* * * * *

UNITED STATES PATENT AND TRADEMARK OFFICE
CERTIFICATE OF CORRECTION

PATENT NO. : 6,768,987 B1  Page 1 of 1
DATED : July 27, 2004
INVENTOR(S) : Couch et al.

It is certified that error appears in the above-identified patent and that said Letters Patent is hereby corrected as shown below:

Column 3,
Line 7, "for for filtering" should read -- for filtering --
Line 8, "to least one" should read -- to at least one --

Column 11,
Line 17, "include an schema" should read -- "include a schema" --

Column 12,
Line 37, "table filters 108:" should read -- "table filters 106:" --

Column 13,
Line 23, "has a either a" should read -- "has either a" --

Column 15,
Lines 33-34, "com-pete" should read -- "com-plete" --

Column 19,
Line 51, "of user-defined;" should read -- "of user-defined filters;" --

Column 20,
Line 6, "according to least one" should read -- "according to at least one" --

Column 22,
Line 16, "of user-defined;" should read -- of user-defined filters;" --

Signed and Sealed this

Twenty-eighth Day of December, 2004

JON W. DUDAS
*Director of the United States Patent and Trademark Office*